United States Patent Office 2,902,637
Patented Sept. 1, 1959

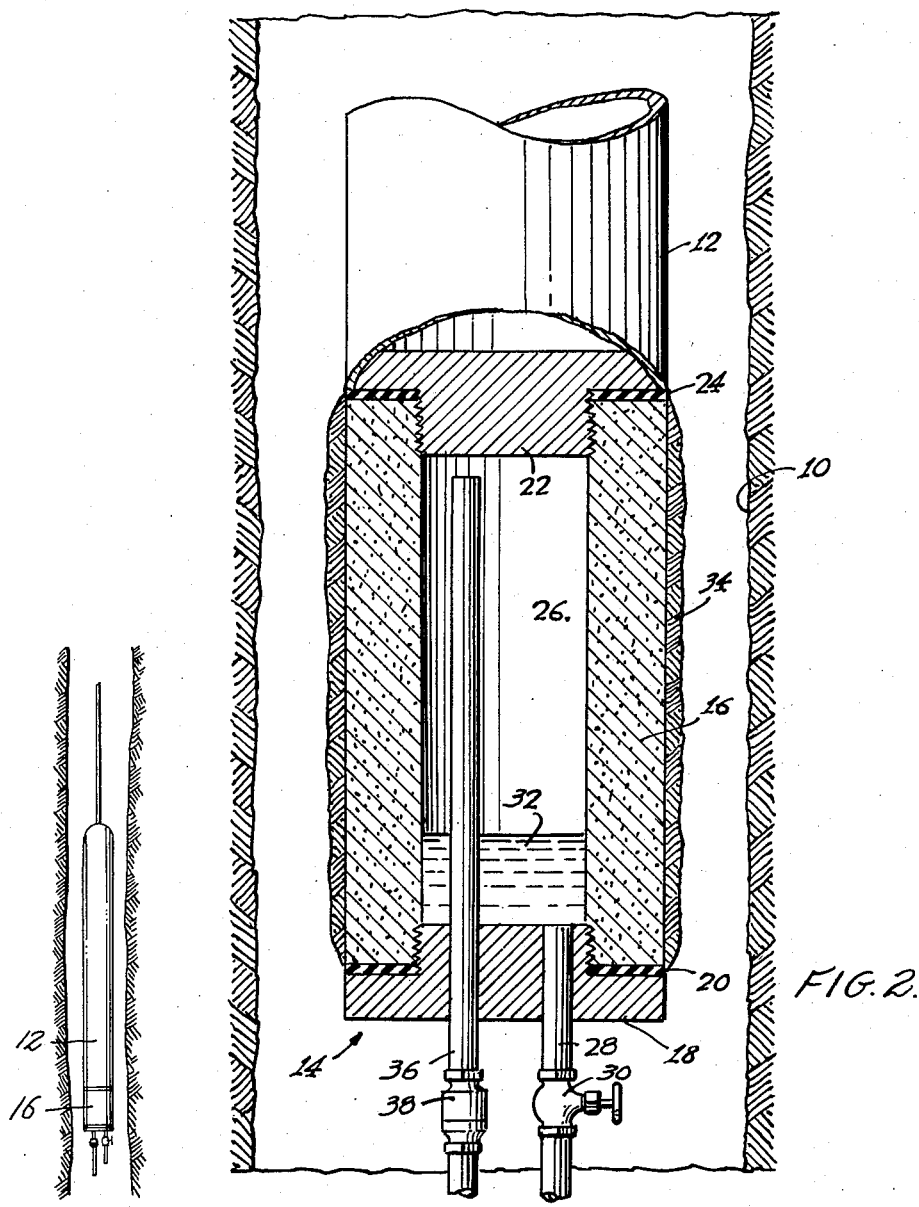

2,902,637

SAMPLING DRILLING FLUID

Malcolm R. J. Wyllie, Indiana Township, Allegheny County, Pa., assignor to Gulf Research & Development Company, Pittsburgh, Pa., a corporation of Delaware Application April 29, 1954, Serial No. 426,439

10 Claims. (Cl. 324—10)

This invention relates to a method of and apparatus for sampling drilling fluid within a borehole. More particularly, this invention pertains to a method of and apparatus for obtaining a specimen of the filtrate or of the filtrate and filter cake of a drilling fluid.

Broadly, the invention comprises immersing an initially empty housing having a permeable wall sufficiently deep in borehole drilling fluid that a portion of the liquid content will be filtered into the housing through the permeable wall through the action of hydrostatic pressure. The housing is then removed from the borehole together with contained filtrate. The filtrate is then removed from the housing for testing. If desired, in addition to obtaining the filtrate specimen, a filter cake specimen that is useful is formed on the permeable wall during the filtration step.

The housing described above can be used independently, or if desired can be manipulated in a borehole in conjunction with standard borehole logging apparatus for reasons of convenience or more accurate correlation of logging data to drilling fluid properties.

A preferred embodiment of the invention is shown in the accompanying drawings, wherein:

Figure 1 is an elevational view of the apparatus of the present invention, the same being shown suspended within a borehole; and Figure 2 is an enlarged central vertical sectional view of the lower end portion of the apparatus shown in Figure 1 with portions thereof being shown in elevation.

In the drawings, the numeral 10 designates a borehole, and the numeral 12 designates logging sonde such as is used in obtaining electric logs. The logging sonde 12 is provided with conventional equipment for raising and lowering it in the borehole 10.

A housing designated generally at 14 is secured to the logging sonde 12 and is preferably disposed at the lower end thereof, as shown. The housing 14 is comprised of a permeable cylindrical sleeve or wall 16, the lower end of which is closed by a removable, flanged plug 18 that is threaded thereinto. Leakage between the plug 18 and the sleeve 16 is prevented by a gasket 20 disposed between the lower end of the sleeve 16 and the flanged portion of the plug 18, as shown.

Means is provided for closing the upper end of the sleeve 16, which in the preferred embodiment illustrated comprises the logging sonde 12 being provided with an externally threaded boss 22 at its lower end. The sleeve 16 is removably threaded on the boss 22, with a gasket 24 positioned between the adjacent ends of the logging sonde 12 and the sleeve 16 in order to prevent leakage therebetween.

Means is provided for removing liquid contents from the filtrate collecting chamber 26 within the housing 14. Such means comprise a tubular conduit 28 (shown in elevation) extending through the plug 18, such conduit 28 extending outwardly from the plug 18 and being provided with a manually-operable valve 30 also shown in elevation.

The sleeve 16 has been described as being "permeable." The nature of the sleeve will be better understood, upon knowing its fundamental function. The sleeve 16 is fundamentally a filter suitable for filtering a drilling fluid so as to permit drilling fluid filtrate to flow through it into the chamber 26 while building up a filter cake on its surface. The sleeve 16 must be of sufficient structural strength so as to withstand failure at the pressure to which the housing 14 is subjected in use.

In order that the sleeve 16 possess the desired filtering properties, it is only essential that the same possess a permeability that will cause the formation of an initial layer of filter cake, inasmuch as the filter cake will thereafter, of itself, constitute the filtering medium. The preferred range of permeability for the material of which the sleeve 16 can be formed is from about 1 millidarcy to about 1,000 millidarcies. Even lower permeabilities to permeabilities as high as 10,000 millidarcies can be used, it being essential only that the permeability be such that, under the conditions of use, an initial layer of filter cake is formed on the sleeve 16. Since filter cake permeabilities are usually very low, say in the neighborhood of $10^{-3}$ to $10^{-4}$ millidarcies, the first layer of filter cake formed takes over the filtering function with the sleeve 16 thereafter constituting a relatively very permeable structural backing therefor.

The sleeve 16 is preferably formed of permeable metal, sintered stainless steel, brass, or bronze being especially preferred. Such materials can be easily formed by known metallurgical processes into a sleeve 16 of sufficient wall thickness for the requisite structural strength and permeability.

The sleeve 16 need not be necessarily of the unitary construction illustrated, but can be of composite form wherein the portion thereof adjacent the drilling fluid can be of the necessary permeability and constituted of such materials as porous Alundum or unglazed porcelain. Such portion of the sleeve 16 is preferably backed with a pervious, relatively stronger backing material to lend sufficient overall structural strength to the sleeve 16.

The preferred mode of operation of the above-described apparatus will now be described. In empty condition and with its valve 30 closed, the housing 14 is lowered in the borehole 10 to a sufficient depth that the hydrostatic pressure of the ambient drilling fluid will cause filtration of the drilling fluid through the sleeve 16 so that filtrate 32 is collected in the chamber 26 and filter cake 34 is deposited on the sleeve 16. Such filtration occurs for the reason that the hydrostatic pressure of the drilling fluid will greatly exceed the pressure initially prevailing within the chamber 26, inasmuch as the chamber 26 initially will contain only air at atmospheric pressure.

The amount of filtrate 32 collected and the amount of the filter cake 34 deposited are principally dependent upon the fluid loss characteristics of the drilling fluid, the physical dimensions of the housing 14 (notably the length and external diameter of the sleeve 16) the hydrostatic pressure of the drilling fluid, and the time of immersion, as will be appreciated by those skilled in the art. All of such variables, with the properties of the drilling fluid being conditionally excepted, are subject to control so that the amount of the specimens collected can be easily controlled.

After a sufficient amount of filtrate 32 is collected, and filter cake 34 deposited if the latter too is desired, the housing 14 is removed from the borehole 10. The filtrate 32 can then be removed through the conduit 28 on opening the valve 30. If desired, measurements with respect to the filter cake 34 can be made while the same is still on the sleeve 16, or after the same is removed from the sleeve by scraping, washing, or the like.

During filtration, the ingress of the filtrate 32 increases the pressure within the chamber, the final pressure being principally determined by the percentage of the volume of the chamber 26 taken up by the filtrate 32. During raising and removing the housing 14 from the borehole 10, the external pressure on the housing 14 will become less than the pressure within the chamber 26, so that the contents thereof can tend to escape through the permeable sleeve 16.

Means is provided to prevent such a flow of fluid through the sleeve 16, which would waste collected filtrate 32. Such means comprises a conduit 36 that extends through the plug 18 to communicate with the chamber 26. The conduit 36 is provided with a check or pressure relief valve 38 that will prevent fluids entering the chamber 26 through the conduit 36, but which will permit fluids to be discharged from the chamber 26 when the pressure within the chamber 26 exceeds the pressure outside the housing 14. Thus, the pressure within the chamber 26 does not substantially exceed ambient pressure during removal of the housing from the borehole 10. Furthermore, since the inner end of the conduit 36 is disposed adjacent the upper end of the chamber 26, such fluids as escape the chamber 26 through operation of the check valve are primarily, if not entirely, air, rather than filtrate.

After the filtrate 32 has been removed, the housing 14 can be readied for reuse by forcing water into the chamber 26 through the conduit 28, while preventing discharge of water from the conduit 36 by any suitable means, not shown, such water then flowing outwardly through the sleeve 16 to displace filtrate from therein and to flush the filter cake 34 from the surface of the sleeve 16. The water in chamber 26 is then drained through the conduit 28, after which compressed air is forced into the chamber 26 through the conduit 28, while again preventing escape of fluids through the conduit 36, to dry the sleeve 16.

The housing 14 need not be formed as an adjunct of the logging sonde 12, it being essential only that the upper end of the sleeve 16 be closed. The housing 14 can be moved or positioned in the borehole 10 as an entirely independent operation; however, preferably the housing 14 is moved jointly with other equipment such as the logging sonde 12 shown.

Use of the housing 14 permits an easy means of collecting as large samples of drilling fluid filtrate 32 as desired, without necessitating the use of elaborate laboratory high-pressure filtration equipment. Samples of filtrate 32 sufficiently large for resistivity measurements in standard electrical resistivity measurement cells can be speedily obtained, such measurements being of special value for proper interpretation of electric borehole logs obtained in the conventional manner. In this latter connection, the joint use of the housing 14 with the logging sonde 12 is believed particularly valuable, since specimens of drilling fluid are obtained from the immediate vicinity of the logging sonde 12 concurrently with obtaining an electric log by use of the logging sonde 12.

Another advantage of the housing 14 and the above-described preferred manner of its use resides in the fact that drilling fluid filtration product specimens can be obtained from a reasonably well-defined predetermined depth by simply lowering the housing 14 quickly to such depth and affording the same a sufficient residence time at such depth so that substantially all of the filtrate 32 is collected at such depth.

Furthermore, the filtrate 32 is thought to be a more reliable specimen than a filtrate obtained by a laboratory filtration of drilling fluid, since the filtrate 32 is obtained under the actual conditions prevailing at depths within the borehole 10.

The preferred embodiment of the invention has been described in considerable detail not to imply limited scope of the invention, but rather to convey a full and complete understanding of the principles thereof. The scope of the invention will admit of substantial departures from the particular described and illustrated embodiment thereof, such as for example the plug 18 can be of the same permeable character as the sleeve 16, or less than all the sleeve 16 can be permeable; and, accordingly, attention is directed to the appended claims for determining the actual scope of the invention.

I claim:

1. A method of obtaining a specimen of drilling fluid filtrate comprising immersing a closed hollow, gas-filled housing that includes a permeable wall in drilling fluid within a borehole to a sufficient depth that ambient hydrostatic pressure causes filtration of a portion of the liquid content of the drilling fluid through the permeable wall and into the housing, removing the housing with a substantial portion of its contained liquid from the borehole while minimizing any pressure differential of the interior of the housing over the drilling fluid ambient thereto by discharging gaseous contents from the upper interior of the housing, and then removing the contained liquid from the housing as a filtrate specimen.

2. In electric borehole logging wherein a logging sonde is immersed in drilling fluid within a borehole, the method comprising concurrently producing an electric borehole log and filtering a portion of the drilling fluid in the immediate vicinity of the logging sonde to obtain a specimen of the filtrate thereof, and thereafter removing a substantial portion of the filtrate specimen from the borehole.

3. In electric borehole logging wherein a logging sonde is immersed to a substantial depth in drilling fluid within a borehole, the method comprising concurrently producing an electric borehole log and maintaining a housing having a permeable wall immersed in the drilling fluid adjacent the logging sonde, so that a portion of the liquid content of the drilling fluid is filtered through the permeable wall and into the housing under the action of the hydrostatic pressure prevailing in the drilling fluid at the substantial depth, removing the housing and a substantial portion of its contained liquid from the borehole, and then removing the contained liquid from the housing as a drilling fluid filtrate specimen.

4. Filtering apparatus comprising a closed hollow housing that includes a permeable wall, said housing having a filtrate collecting chamber therein, a fluid conduit provided with valve means communicating between the chamber and the exterior of the housing, and means for positioning said housing in a borehole.

5. The combination of claim 4, wherein said valve means comprises a pressure relief valve, said conduit having one end disposed within the chamber at a position spaced above the bottom of the chamber.

6. Sampling apparatus comprising a closed hollow housing adapted to be moved in a borehole and having sufficient structural strength to withstand the hydrostatic pressures prevailing in a drilling fluid at a substantial borehole depth, said housing including a permeable wall and having a filtrate collecting chamber therein, and a fluid conduit provided with valve means communicating with the chamber.

7. The combination of claim 6, wherein said valve means comprises a pressure relief means, said conduit having one end disposed within the chamber at a position spaced above the bottom of the chamber.

8. A sampling apparatus comprising a permeable sleeve adapted to be moved in a borehole, means closing the opposite ends of the sleeve to define a filtrate collecting chamber therein, and a conduit provided with valve means communicating between said chamber and the exterior of the sleeve.

9. The combination of claim 8, wherein said valve means includes pressure relief means, said conduit having one end disposed within the chamber at a position spaced above the bottom of the chamber.

10. In electric borehole logging apparatus, a logging sonde, and a housing secured to and adapted to move with the logging sonde in a borehole, said housing including a permeable wall, and a fluid conduit provided with pressure relief valve means communicating between the interior and the exterior of the housing, said conduit having one end disposed above the bottom of the interior of the housing.

References Cited in the file of this patent

UNITED STATES PATENTS

| | | |
|---|---|---|
| 2,335,558 | Young | Nov. 30, 1943 |
| 2,359,386 | Reinsch | Oct. 3, 1944 |
| 2,569,625 | Wyllie | Oct. 2, 1951 |
| 2,600,150 | Abendroth | June 10, 1952 |